3,532,949
COMMUTATING ELECTRIC CURRENTS
Frederic Calland Williams, Prestbury, Cheshire, and George Francis Nix, Flixton, Lancashire, England, assignors to National Research Development Corporation, London, England, a corporation of Great Britain
Filed Nov. 6, 1968, Ser. No. 773,756
Claims priority, application Great Britain, Nov. 8, 1967, 50,916/67
Int. Cl. H02p 7/00; H01r 39/46; H02m 7/60
U.S. Cl. 318—138                22 Claims

ABSTRACT OF THE DISCLOSURE

The apparatus described converts direct current into square wave alternating current by using a commutator, brushes, and a controlled rectifier to prevent sparking. The commutator is divided into at least four segments one of which is connected to the positive of the D.C. supply and another of which is connected to the negative of the D.C. supply. One rectifier is then connected between the positive supply and one remaining segment, and other rectifier is connected between the negative supply and the last remaining segment. The load current first passes in one direction by way of the first segment and it is then diverted through the second segment and one of the rectifiers, and is later commutated by back biasing the rectifier. There is then no load current when one of the brushes meets the third segment and current is reversed. The process is repeated when current again has to be commutated. The segments can be in one ring or two rings and multi-phase loads can be supplied.

---

The present invention relates to commutators, particularly commutators used to provide square-wave alternating electrical current (A.C.) from direct current (D.C.).

Static inverters using thyristors to produce a square-wave output voltage from a d.c. supply are well known. Such inverters have been used in two or three phase forms to supply squirrel cage induction motors and achieve economic speed control by variation of the frequency.

A better performance can be obtained from an induction motor fed from a square-wave voltage source if a large number of phases are used. A polyphase static inverter requires considerable electronic circuitry to produce the required trigger pulses at the correct phasing. Each phase requires at least two thyristors, plus two diodes to handle the reactive current. Such equipment is expensive in components and also to protect in the event of a fault.

According to one aspect of the present invention there is provided apparatus for switching electric currents including first and second terminals, a rotatable commutator having a plurality of conductive segments insulated from one another, brush means positioned to contact the segments sequentially when the commutator is rotated, at least one controlled rectifier, a first circuit, which excludes the rectifier, for connecting the first and second terminals by way of the brush means and a first of the segments when the brush means contacts the first segment, a second circuit for connecting the first and second terminals by way of the rectifier, the brush means and a second of the segments when the brush means is in contact with the second segment, substantial currents being able to pass between the terminals only by way of the second circuit when the brush means is in contact with the second segment only, firing means for causing the rectifier to conduct before the brush means breaks contact with the first segment, and extinguishing means for causing the rectifier to cease conduction before the brush means breaks contact with the second segment.

According to another aspect of the present invention there is provided apparatus for providing alternating current from a direct current supply, including brush means which contacts first, second, third and fourth segments of a commutator in that order when the commutator rotates in one direction, the segments being conductive and insulated from one another, first and second circuits for connecting first and second supply terminals, respectively, to a load terminal when the brush means contact the first and third segments, respectively, a first controlled rectifier connected between the first supply terminal and the load terminal when the brush means contacts the second segment, a second controlled rectifier connected between the second supply terminal and the load terminal when the brush means contacts the fourth segment, first and second firing means for causing the first and second rectifiers to conduct before the brush means breaks contact with the first and third segments, respectively, and extinguishing means for causing the first and second rectifiers to cease conduction before the brush means break contact with the second and fourth segments, respectively, the arrangement being such that if a tapped direct current supply is connected between the supply terminals a load is connected between the load terminal and the tap of the supply, and the commutator is rotated, the load passes alternating current.

The term, controlled rectifier, in this specification means a rectifying device which does not conduct when forward biassed until a control signal is applied to a control electrode thereof. Examples of controlled rectifiers are thyristors and thyratrons. The term also includes a number of such rectifying devices connected in parallel.

The first and second firing means may include first and second transformers whose secondary winding are connected to the control electrodes of the first and second rectifiers, respectively. The first and third segments are then each divided into a main section and a subsidiary section insulated from one another but connected by way of the first and second transformers primary windings, respectively.

The extinguishing means may include a tapped inductor so connected that, in operation, current flows first through one rectifier and one part of the inductor and then through the other rectifier and the other part of the inductor, and a capacitor connected between the common supply terminal and the tapping terminal of the inductor. The brush and commutator means are arranged to connect the second supply terminal to that end of the inductor, which is not receiving current from the first rectifier, when the first rectifier is to cease conduction.

The commutator may include two rings of segments and the brush means may include two brushes. The inductor may then be connected between the brushes. The first of the rings of segments contacted by the first of the brushes, includes the first and second segments together with an additional isolated segment, and the second ring contacted by the second brush includes the third and fourth segments together with a further isolating segment. The rings and brushes are so isolated in relation to one another that just before the first brush moves out of contact with the second segment the second brush contacts the third segment, back biassing the first rectifier through the action of the extinguishing means. The rings and brushes are also located to cause the second rectifier to be back biased in a similar way.

The apparatus described in the preceding paragraph may be modified to provide a multi-phase supply. A tapped inductor connected between a pair of brushes and a capacitor connected between the tapping point and neutral is pro-

3 vided for each phase. The brush pairs are equally spaced round the commutator, and the supply terminals for the load are the tapping points. The isolating segments are divided into two parts insulated from one another so that the brush of each pair which is not carrying current is isolated from other brushes in contact with the same ring during commutation.

The embodiment of the invention which has a two-ring commutator and a single-phase output is preferably modified by connecting the inductor between the first and second rectifiers instead of the brushes, connecting the second and fourth segments together, and to the inductor's tapping point, and connecting the brushes to provide an output terminal. Third and fourth transformers are then required with secondary windings connected to the control electrodes of the first and second rectifiers, respectively. The first and third segments are further divided so that each has a further subsidiary section at the other end of the main section from the other subsidiary section, and the primary windings of the third and fourth transformers are connected between the main and further subsidiary sections of the first and third segments, respectively. The further subsidiary sections are so positioned that the brushes not carrying current contact them before breaking contact with the second and fourth segments, and the rectifier not carrying current is fired.

A poly-phase supply may be arranged by providing a brush pair for each phase, dividing the isolating segments in the way mentioned.

The apparatus in which the inductor is connected between the rectifiers may be modified by using a commutator with one ring only which comprises the four subdivided segments but no isolating sections. One brush only is then required for a single phase supply.

As an alternative to a purely electronic inverter, the present invention provides a hybrid mechanical/electronic commutator to provide a polyphase supply. Only two thyristors are used irrespective of the number of phases. The phase current is carried by brushes on a rotating commutator except during the brief period of the cycle during actual commutation of the current. The time phasing is set by the construction of the commutator and the frequency by the speed of rotation. The operation is entirely sparkless due to the brushes taking no action in the commutation of load current.

Certain embodiments of the invention will now be described by way of example with reference to the accompanying drawings in which.

Figures 1, 2:
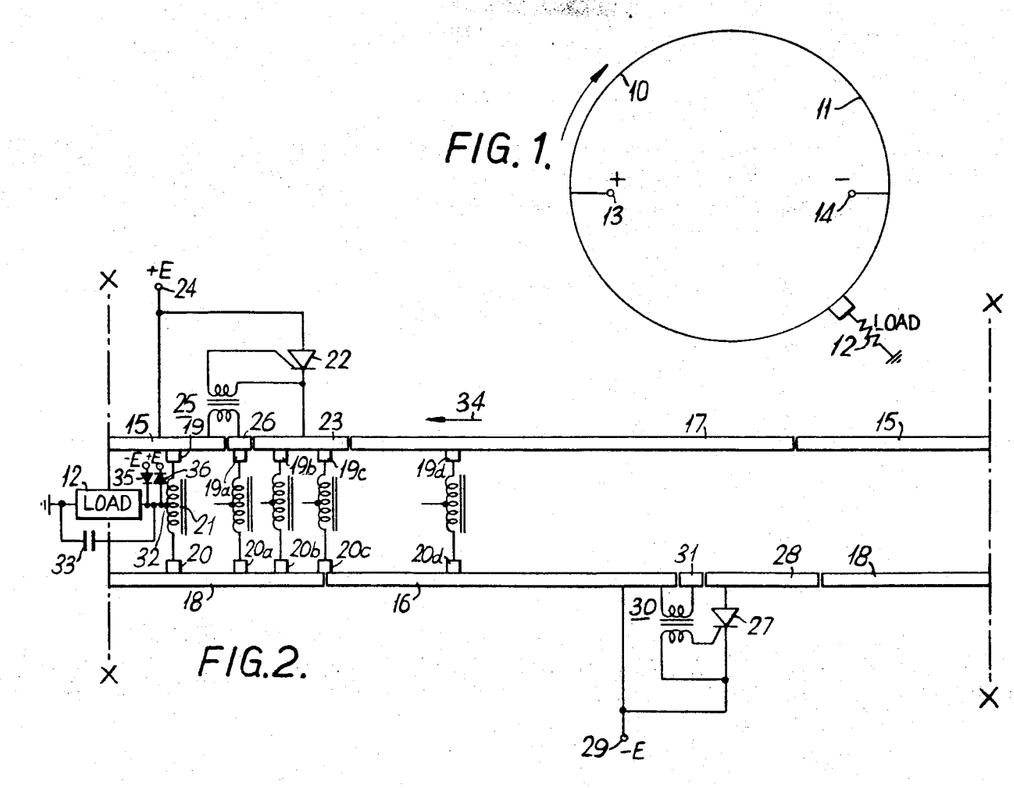
FIG. 1 is a schematic diagram of theoretical apparatus for converting D.C. into A.C.
FIG. 2 is a schematic diagram of a first embodiment of apparatus according to the invention, and includes a developed representation of a cylindrical commutator.

In FIG. 1 a rotating commutator with two segments 10 and 11 can in principle produce a square wave voltage across a load 12 from a centre tapped D.C. supply (not shown) connected to terminals 13 and 14. Destructive sparking at the brush must occur with this simple mechanical arrangemetnt, and it is therefore necessary to remove the duty of commutating the load current from the commutator segments and the brush.

In principle this can be achieved by transferring the load current to a thyristor just prior to commutation, commutating the current by some static technique and then transferring the reversed current back to the brush until the next commutation interval is approached. Thus the brush carries the load current for the majority of the cycle but carries no current whilst it slides from the positive to negative segments and vice versa.

In FIG. 2 a positive segment 15 of a cylindrical commutator is positioned in a separate ring from a negative segment 16. FIG. 2 has been developed in drawing by "cutting" the commutator cylinder along a line XX and opening it out to provide a flat representation in the plane of the figure. Isolated segments 17 and 18 are located in the same rings as segments 15 and 16, respectively. Wide brushes 19 and 20 (or brush pairs) capable of bridging the gap between commutator sections contact the rings and are connected by way of a centre-tapped choke 21, whose two halves are closely coupled. For clarity in the following explanation, the brushes 19 and 20 are also shown in positions 19a to 19d and 20a to 20d which they take up subsequently as the commutator rotates in the direction of an arrow 34.

A thyristor 22 is connected between a segment 23 and a supply terminal 24 coupled to a brush and a slip ring (not shown). The primary winding of a pulse transformer 25 is connected between a subsidiary segment 26 of the segment 15, and the segment 15. The secondary of the transformer is connected between the control electrode of the thyristor 22 and its cathode. Identical connections are made between a thyristor 27, a segment 28, a supply terminal 29 coupled to a further brush and slip ring (not shown), a transformer 30 and a subsidiary segment 31.

In operation the rings rotate so that they appear to move from right to left in FIG. 2. At first current flows from the slip ring and the brush connected to the terminal 24 through that part of the choke between the brush 19 and a centre tapping point 32 to the load 12. Just before the brush 19 reaches the position 19a it bridges the gap between segments 15 and 26 and begins to pass current through the primary of the transformer 25. The load current in this primary provides a pulse in the secondary which, when the brush 19 bridges the gap between the segments 26 and 23, fires the thyristor 22. It is usually preferable to load the secondary windings so that the primary windings present only a small series impedance to the load current. By the time the brush 19 reaches the position 19b all the load current flows through the thyristor 22. When the brush 20 reaches the position 20c the end of the choke connected to the brush 20 takes the potential −E of the terminal 29. The tapping point is held at its previous potential, that of the terminal 24, +E, by a capacitor 33, and since the two halves are closely coupled a voltage +E is induced in the half of the choke connected to the brush 19. Thus the voltage of the brush 19 rises to +2E, back biassing and extinguishing the thyristor 22. The brush 19 can now transfer to the segment 17 while it does not carry current.

With the brush 20 in the position 20c, current flows from the brush and the slip ring connected to the terminal 29, through the half of the choke 21 connected to the brush 20 and through the load 12 to earth; that is a reverse current now flows and continues to do so while the brushes 19 and 20 contact the segments 17 and 16, as in the positions 19d and 20d.

Providing the capacitor 33 and the choke 21 are well chosen with regard to the turn off time of the thyristor, the load current and the load inductance, then the thyristor will achieve its blocking condition, shutting off current from the positive supply and isolating segment 23. On resistive load the load current immediately reverses and flows through the bush 20. On inductive load it will reverse some time later, the condenser 33 supplying the load meantime. In either case, commutation of current from one brush to the other is achieved without sparking since the brush 19 is not carrying current when it leaves segment 23 and moves on to the adjacent isolated segment. The addition of two "feedback" diodes 35 and 36 between the load to the positive and negative terminals 24 and 29 enables reactive loads to be handled with very much smaller values of inductance and capacitance for the choke and capacitor as in standard inverter practice. For example suppose the load 12 is inductive. When the thyristor has just been turned off by the brush 20 contacting the segment 16, the current through the load 12 from the choke to earth must fall exponentially, that is this current will continue to flow from a short interval. The thyristor 22 is back biassed and current from the terminal 29 would be in the wrong direction. However the required current can be drawn through the diode 35. The diodes 35 and 36 do not normally conduct since the potential at the choke's tap is practically equal to that of the supply terminal 24 or 29.

At the end of the negative half cycle it is necessary to repeat the commutation process with the thyristor 27 and its associated components and segments in order to transfer current back to the brush 19 when it reaches the positive segment 15.

If commutation fails, the current is broken mechanically by the brush moving to an isolated segment and the circuit has the opportunity of commutating correctly at the end of the next half cycle.

Figure 3:
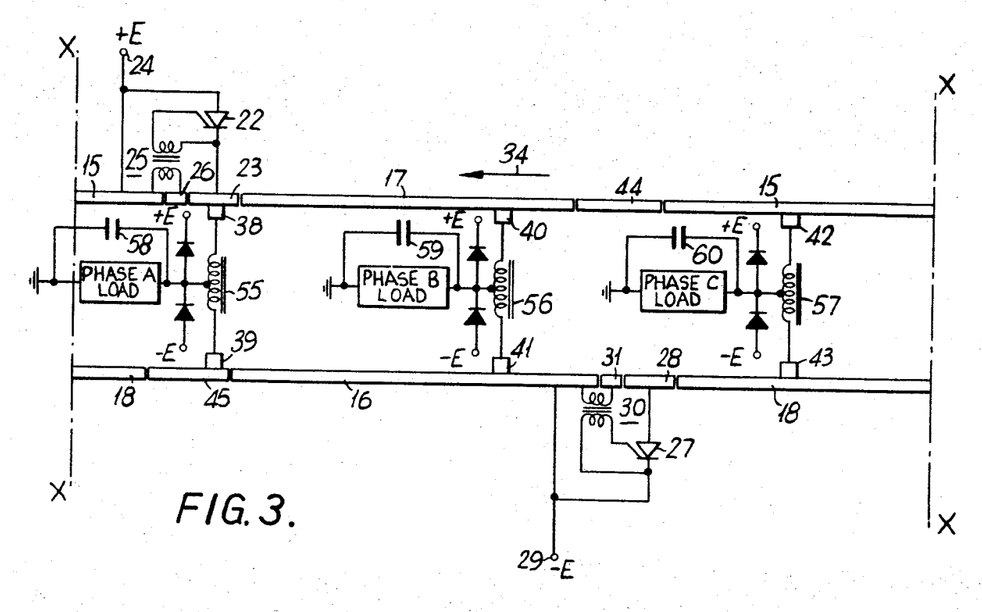
FIG. 3 is a schematic diagram of a second embodiment of apparatus according to the invention for providing a three-phase output current and also includes a developed representation of a cylindrical commutator.

An advantage of the apparatus of FIG. 2 is that it may be adapted to produce any number of output phases but still only use two thyristors. FIG. 3 shows how more brush pairs, 38–39, 40–41 and 42–43, are included to give a polyphase output, in this case three phase with loads A, B and C. The same designators have been used where appropriate as in FIG. 2 and FIG. 3 is developed in the same way. Each brush pair has its associated commutating inductor 55, 56 and 57 and capacitor 58, 59 and 60 plus two "feedback" diodes. Extra isolating segments 44 and 45 are introduced in each ring to ensure that the brush pairs are independent of each other as they enter and leave the current transfer zone.

Minimum spacing of the brush pairs is a function of brush width and the isolating segments, 44 and 45. The isolating segments 45 and 44, must start at least one brush width before the segments 26 and 31 respectively. The separation of adjacent phases must exceed the sum of segments 26 and 23, plus two brush widths.

The thyristors are now used to perform $2m$ switching operations per cycle where $m$ is the number of phases. If the thyristors and the pulse transformers are mounted externally six slip rings are needed to get connections to the segments on the rings. Two of the slip rings must carry the resultant D.C. supply current and the other four the phase current. If the thyristors and the pulse transformers are mounted on the rotating member, only the two supply current slip rings are needed.

Each phase must have its own commutating components in the above system. Also the commutating sequence is initiated by a somewhat uncertain contact between the end of the choke and the supply rail, namely the brush hitting the "live" segment. In a conventional static inverter this contact is achieved by "firing" another thyristor. The turn-on time of thyristors is of the order of micro seconds and the large current surge into the choke necessary to achieve rapid commutation with small values of capacitance and inductance is readily available. Contact of the brush to the segment is initially a "point-contact" of extremely high resistance owing to the characteristic brush drop and it is by no means certain that the initial contact is final. Bounce, spark erosion, etc., may delay final contact with the overall effect is of a very long "turn-on-time" compared with a thyristor. Consequently the capacitance and inductance values have to be larger than otherwise necessary. Considerable improvement can be achieved by using brushes containing high proportions of metal or even solid metal brushes, but the arrangement is not entirely satisfactory and also presents considerable mechanical difficulties. Some brush drop is in any case an advantage to avoid possible light sparking at the stage when current is transferred to the thyristor.

Figure 4:
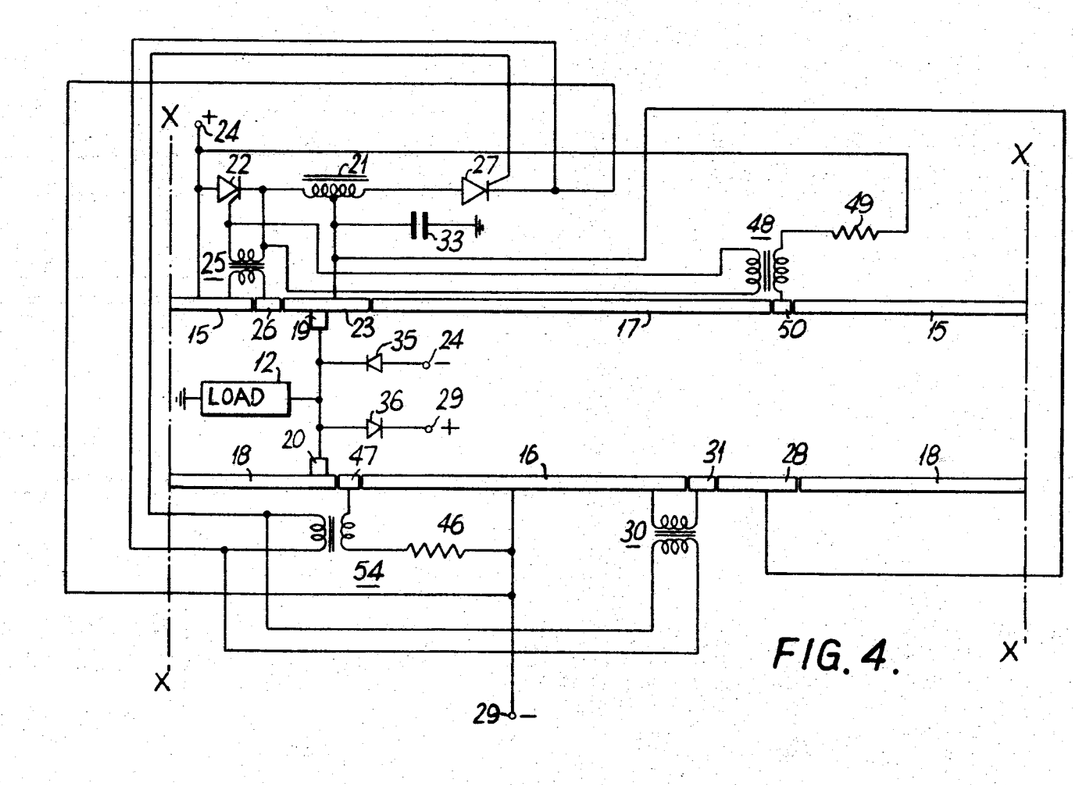
FIG. 4 is a schematic diagram of a third embodiment of apparatus according to the invention, also with a developed commutator.

A modification to the arrangement allows a single inductor and capacitor to commutate each phase in turn and also have the rapid turn-on characteristic of the static inverter as now described with reference to FIG. 4 where designations used in earlier figures are again used for components having similar functions. FIG. 4 is developed in the same way as FIGS. 2 and 3.

The choke 21 and the thyristors are series connected between the supply terminals 24 and 29, and the choke's tapping point is connected to the segments 23 and 28. A further pulse transformer 54 has its primary winding connected in series with a resistor 46 between the segment 16 and an additional, narrow, segment 47, and its secondary winding connected between the control electrode and the cathode the thyristor 27. A transformer 48, a resistor 49 and an additional, narrow, segment 50 are similarly connected, with the secondary winding of the transformer 48 connected to the thyristor 22.

In operation as the brush 19 passes from the segment 15, to the segments 26 and 23 the thyristor 22 is fired and carries the load current in the way already described. When the brush 20 contacts the segment 47, current flows through the primary of the transformer 54 causing thyristor 27 to conduct. The capacitor 33 is already charged to the positive supply voltage and the action of turning on the thyristor 27 causes the thyristor 22 to be back biassed and ceases conduction in the way already described. The thyristor 27 then passes load current in the opposite direction. When the brush 20 reaches the segment 16, the thyristor 27 is short circuited and its current decays and can cease as the brush 19 passes on to the isolated segment 17 without sparking. Similar commutation occurs when the brushes 19 and 20 contact the segments 31, 28, 50 and 15, the load current being transferred back to the thyristor 22 and later the segment 15.

Polyphase operation is obtained by equally spaced extra pairs of brushes around the commutator. As described above in connection with FIG. 3, extra isolating segments must be introduced. Each phase must have its own feedback diodes but only one inductor and one capacitor is needed. A total of seven slip rings are needed if components are mounted externally although two of these only carry signal currents. Rotating components require only two slip rings.

The trigger pulses obtained from the segments 47 and 50 are very short since they are derived between the centre tap of the choke and the supply line to which commutation is occurring. These pulses only collapse when commutation is achieved and so are necessarily of sufficient duration. The segments 47 and 50 are sufficiently short to prevent interruption of the supply to the load if the thyristor current is extinguished immediately after commutation, due to an inductive load. Should this occur and the inductive load be such as to require the current to change over from the feedback diode 35 to the negative supply before the brush meets the negative supply segment, there would be an interruption of the supply current.

The number of output phases must be an odd integer to ensure that the capacitor 33 is always left in a correct state of charge after commutation ready for the succeeding current transfer.

Figure 5:
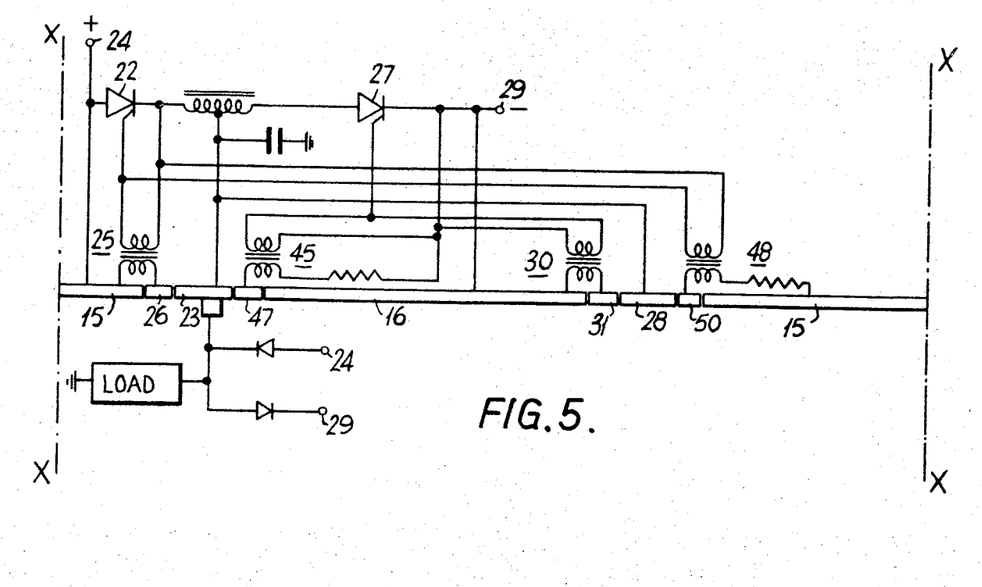
FIG. 5 is a schematic diagram of a fourth embodiment of apparatus according to the invention, using one ring of commutator segments only, the commutator again being developed.

The apparatus of FIG. 4 may so modified that only one ring is used as shown in FIG. 5 where components having the same functions as in earlier figures have been designated in the same way.

In apparatus based on FIG. 5, it is possible to get a break in the supply with a purely resistive load unless a brush is provided which is wider than the segments 47 and 50. With the brush on the segments 23, commutation occurs when its leading edge touches segment 47, and the load current reverses, flowing through thyristor 27. The brush leaves the segment 23 and passes on to the segment 47, which is connected to the supply via the high impedance of the primary of the transformer 54, and breaks the load circuit through the thyristor. The load current cannot then flow to the brush until it touches segment 16, unless the effective brush width is sufficient to span from the segment 47 to the segment 16, and from the segment 50 to the segment 15. An electrically connected brush pair may be necessary rather than a wide brush. Again the arrangement of FIG. 5 may be extended to provide a polyphase supply.

If a synchronous machine is driven from a rotary inverter of this type it is possible for the system to self-sustaining by coupling the motor and commutator together.

The next embodiment of the invention to be described uses a single ring as does the arrangement of FIG. 5, but incorporates features that simplify the arrangement and reduce the number of components. The pulse transformers 45 and 48 are no longer required, the number of segments reduced and only two "feedback" diodes are required irrespective of the number of output phases.

Figure 6:
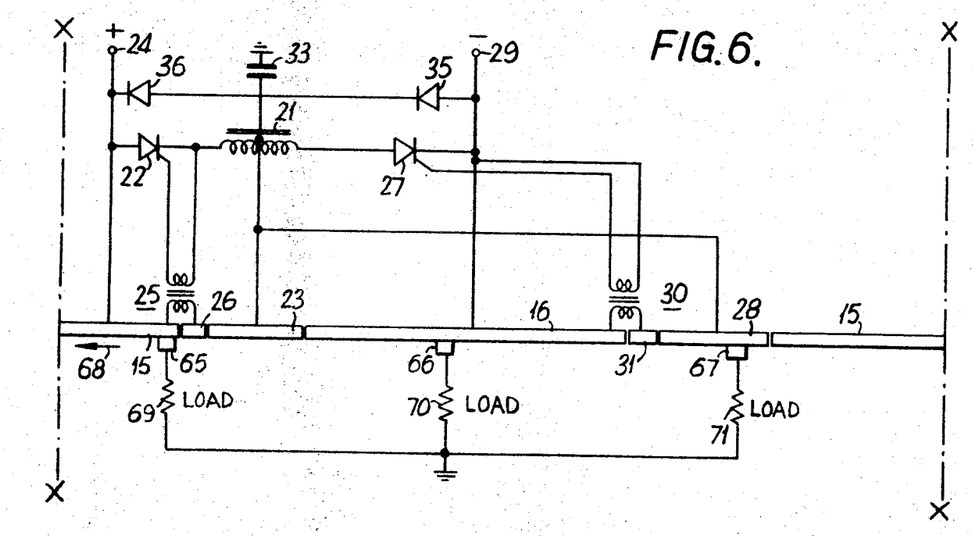
FIG. 6 is a schematic diagram of a fifth embodiment of apparatus according to the invention, using one ring of commutator segments only, for a multi-phase supply, the commutator being developed.
Figure 7:
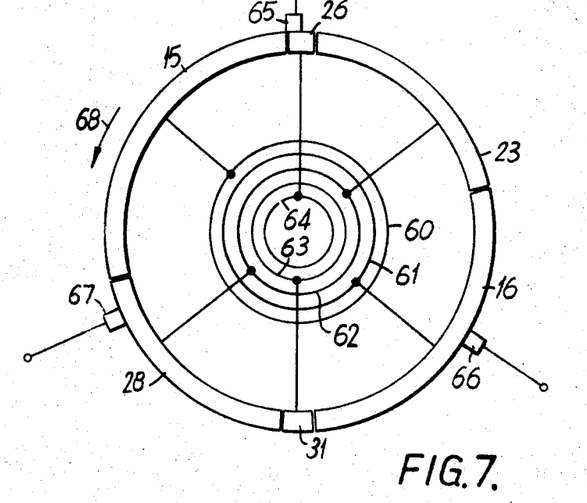
FIG. 7 shows an end view of the commutator of FIG. 6, and slip rings used to couple the commutator to other components.

FIGS. 6 and 7 show a three-phase commutator which as with the previously described arrangements is rotated by a small auxiliary drive machine (not shown). The same designators are used in FIGS. 6 and 7 as for earlier figures.

A single commutator ring is divided into the six unequal segments 15, 26, 23, 16; 31 and 28 there being three pairs of three different sizes, each pair being diametrically opposite, see FIG. 7. The segments 23 and 28 are electrically connected together. Five slip rings 60 to 61 on the same shaft as the commutator allow external connection of supplies and circuit components to the segments. The segment 15 is connected to the positive terminal 24 of a D.C. supply and segment 16 to the negative terminal 29. The segment 26 is connected via the primary of the pulse transformer 25 to the positive terminal 24. Segment 31 is similarly connected via the pulse transformer 30 to the negative terminal 29.

The commutating circuit is connected as shown and consists of the two thyristors 22 and 27, the commutating choke 21 and the condenser 33. The two feedback diodes 36 and 35 are connected to the centre point of the choke or tapping points on the choke as in standard inverter practice. The segments 23 and 28 are connected to the centre point of the choke.

Each phase is supplied via a single brush 65, 66 and 67 on the commutating ring. The phases may be connected in star or mesh between the output brushes. The diagram shows the load comprising resistors 69, 70 and 71 connected in star with the star point connected to the earthed centre tap of the D.C. supply. The brushes are equally spaced around the periphery.

The secondary of the pulse transformer 25 is connected to the control terminal of thyristor 27. Some extra components, which are described below, in each secondary circuit ensure that the trigger pulse is suitable for reliable triggering of the thyristors.

The operation of the device is dependent on the length of the six commutator segments, relative to the spacing of the output brushes, being such that the current transfer action of one of the brushes crossing from the segment 15 to the segment 26 or from the segment 16 to the segment 31 also initiates commutation in another phase.

In operation, when the output brush 65 moves from segment 15 to 26 as the commutator rotates in the direction of the arrow 68, the phase current, that is the current flowing through the resistor 69, is diverted via the primary of transformer 25. The pulse output on the secondary of this transformer triggers the thyristor 22 into conduction as the brush reaches the segments 23 and phase current diverts through the thyristor and half of the commutating choke 21. It is now necessary to commutate the supply to the brush 65, so that it is connected to the negative supply by the time it meets segment 16. Segment 23 is sufficiently long, to ensure that the segment 31 touches the brush 66 before the brush 65 leaves the segment 23. The passage of the segment 31 under brush 66 causes a trigger pulse to be applied to the thyristor 27, causing it to fire. Since the thyristor 22 is still conducting at this stage, commutation occurs, the thyristor 22 being back-biased by the commutating choke 21 and the condenser 33 in a way similar to that described above in connection with FIG. 2, by connection of the negative terminal 29 to the choke. The brush 65 is now connected to the negative supply via thyristor 27. On purely resistive load the phase current immediately reverses, but on inductive loads the reactive current continues to flow through the appropriate feedback diode 35 or 36.

Further movement of the commutator causes the brush 66 to move on to the segment 28, and the load current for the resistor 70 is then diverted through the thyristor 27 in the manner described above in connection with the brush 65 and the thyristor 22. The thyristor 27 then carries the net current of the two phases until the brush 65 meets segment 16, and thereafter carries the phase current of the brush 66 until it is in turn commutated by the arrival of the segment 26 under the brush 67.

Thus commutation is always initiated by the commencement of the current transfer process in one of the other phases. Provided an odd number of output phases is used, the condenser 33 is always correctly charged for the incoming phase. The commutating circuit operates at a frequency of $m$ times the output frequency where as above $m$ is the number of phases. Only two feedback diodes are required since even if reactive current is still being fed back when the brush leaves segment 23 or 28, this current can then flow directly through the brush to the supply.

Figure 8:
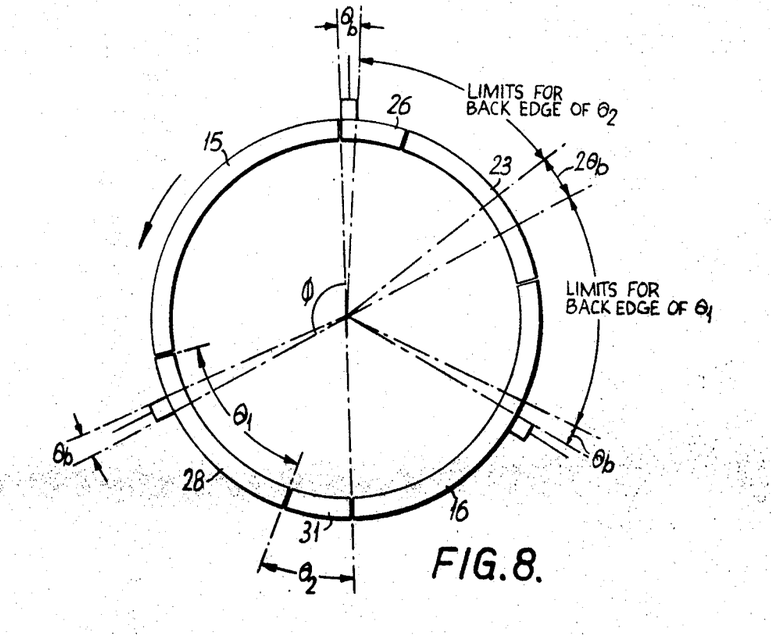
FIG. 8 shows certain angles defined in explaining the operation of the arrangement of FIG. 7.

The limitations on the length of each segment can be seen from FIG. 8. The segments 23 and 28 subtend an arc $\theta_1$ and the segments 26 and 31 subtend an arc $\theta_2$.

Then, to ensure reliable contact of the brush with segments 26 and 31, $\theta_2 \geq \theta_b$ where $\theta_b$ is the arc subtended by a brush at the surface of the commutator; and to ensure that the brush is on the segment 23 or 28 ready for commutation when the other brush touches the segment 31 or 26, $\theta_2 \leq \phi/2 - \theta_b$ where $\phi$ is the angular separation between the brush centres; that is $$\phi = 2\pi/\text{number of phases}$$

Also to ensure that adjacent output brushes do not simultaneously contact the combined arc of $\theta_1$ and $\theta_2$, $$\theta_1 + \theta_2 > \phi - \theta_b$$

Finally to ensure that the brush of the phase to be commutated is still on segment $\theta_1$ when the brush initiating commutation is completely in contact with $\theta_2$, $$\theta_1 + \theta_2 > \phi/2 + \theta_b$$

Thus there is some choice in the relative lengths of the segments 23 and 31, or 28 and 26 within the above limits.

Within this choice there are two possible modes of operation. Extending the length of the segments 31 and 26 beyond a brush width prolongs the duration of a trigger pulse. If the length of the segments 31 and 26 are large, the commutated phase brush can pass to the supply segments 15 or 16 before current transfer occurs in the incoming phase. The description of operation given above is then modified in two respects. First, one of the thyristors only ever carries one phase current at any instant. Secondly, a trigger pulse is available to refire the thyristor carrying the phase current at any time up to the arrival of the supply segment at the brush. This avoids any possible interruption of the supply to a phase if the phase current should fall below the hold on value of the thyristor during the period immediately after commutation.

Figure 9:
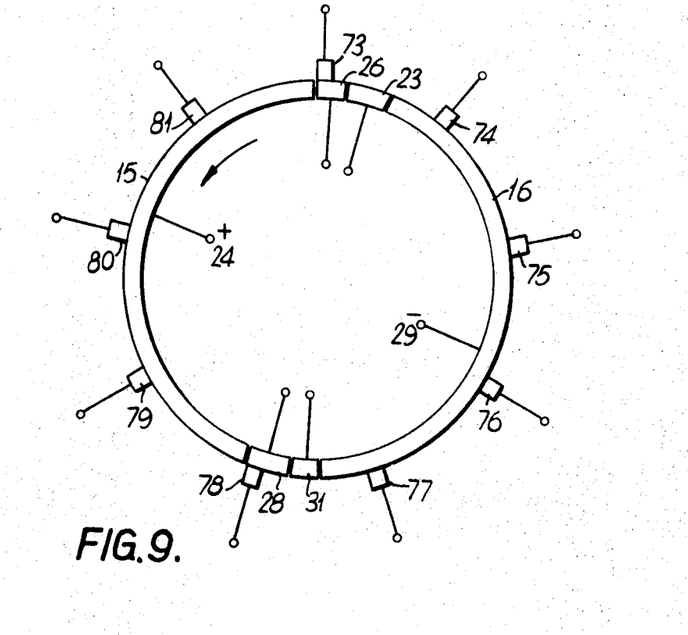
FIG. 9 is an end view of a commutator of a sixth embodiment of the invention for supplying a nine phase load.

FIG. 4 shows an arrangement for a nine phase output converter. The commutating circuit is exactly the same as the three phase case, for any odd number of output phases, but the combined arc of segments 26 and 23, and 31 and 21 is reduced so that the period that a thyristor is connected to an output phase is reduced. Nine brushes 73 to 81 are provided. The greater the number of output phases, the greater is the economy in commutating components.

The five slip rings are required if all the commutating circuit is mounted externally, but as previously only two of these carry the fall D.C. supply current. The remaining three carry the phase currents during the commutation period and may be eliminated if components are mounted on the shaft.

The rating of the thyristors is set by the magnitude of the phase current before and after commutation and the switching rate which is set by the output frequency and the number of phases.

The trigger circuit of the above arrangement relies on sensing the load current. The pulse transformers 25 and 30 are current transformers in the sense that they are in series with the load when an output brush is on segment 26 or 31. Their secondary windings are therefore loaded to present a small series impedance at their primary windings. The signal across this secondary load can then be amplified and shaped so as to present a suitable firing pulse to the thyristor under wide variations of load current and output frequency.

When the converter is used to supply a polyphase induction motor, the condition of the motor running on no-load is important. The phase current waveform of an induction motor when running on no-load and supplied with a square wave of voltage has a pulse of current at the end of each half-cycle. During the greater part of the cycle the current is very low relative to this pulse and the full load current. The line current similarly contains large current variations. The output brush current at the instant when a trigger signal is required can therefore be very low and even reversed for a brief interval. A current sensing trigger such as described above must be designed to produce a pulse under these conditions to achieve reliable commutation. The transformer output pulse can be rectified and amplified to sense small bi-directional currents.

In addition a ballast resistance load is preferably connected in parallel with the motor so that the net brush current waveform is biased by an amount sufficient to make current sensing easier. The extra current drain need only be a small fraction of the full load current. The ballast load is only needed under no-load conditions of the motor, and can be automatically switched out when the load current waveform becomes more uniform under load conditions.

Alternative trigger methods can be used which are independent of load current. These require additions to the commutating ring in order to sense its position. For example, an inductive pick-up, a photo-electric device or an auxiliary contact system could be used to initiate the commutation and current transfer.

The output frequency is set by the rotational speed $n$ r.p.m. of the converter. In the above examples the frequency is related to the speed as $$f = \frac{n}{60} \text{ c./s.}$$

To avoid excessive rotational speeds for high output frequencies, the commutator ring can be made with a multiple of the six segments around the periphery, so that more than one output cycle is performed per revolution.

Figure 10:
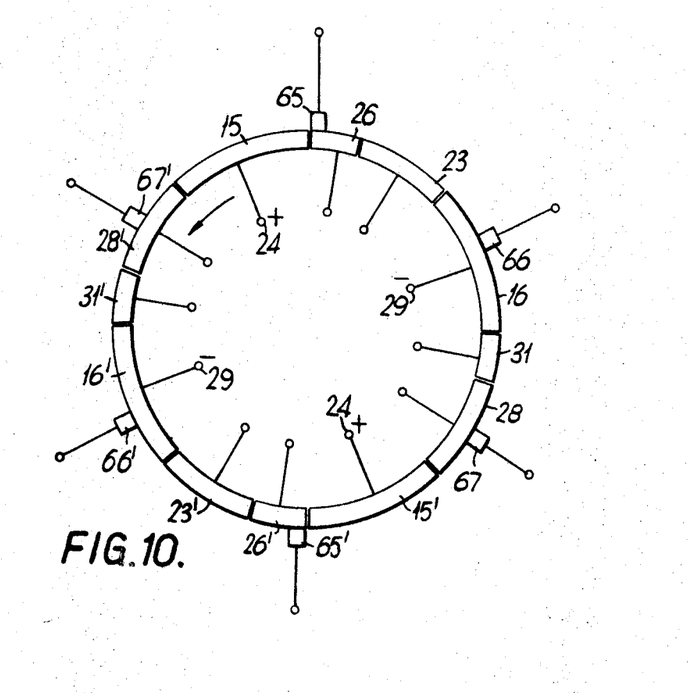
FIG. 10 is an end view of a commutator of the seventh embodiment of the invention where twice as many commutator segments are used as in FIG. 6 to obtain a higher frequency output.

FIG. 10 shows a three phase converter arranged to give two cycles per revolution. The six segments of the converters shown in FIGS. 7 and 9 have been compressed to occupy half the periphery, and duplicated to provide segments 15', 26', 23', 16', 31' and 28' over the other half to give two repeatable sections. The output brushes are now only 60° apart and in the simplest form only brushes 65, 66 and 67 are needed. If required, additional brushes 65', 66', and 67' may be used and connected in parallel with the brushes 65, 66 and 67. The latter arrangement serves to increase the current collection ability of the device and utilise the periphery of the commutator better. The commutation circuit remains the same as previously.

In principle this arrangement can be extended by further subdivision of the commutating ring to provide several repeatable sections and hence higher frequencies per revolution. The frequency is then $$f = \frac{n}{60} P$$

where P is the number of repeatable sections.

The single commutator ring arrangements of FIGS. 6 to 10 require a single narrow brush for each output phase, instead of a "wide" or "split" brush.

While specific embodiments of the invention have been described with reference to apparatus for providing A.C. from D.C. it is to be understood that the invention can also be used for other commutating applications. For example where it is desired to switch a current off, a single brush and a single thyristor may be used with two segments of a commutator. The current flows when the brush contacts the first segment, the thyristor being triggered off when the brush contacts the second segment, and switched off before the brush leaves the second segment.

While the invention has been particularly shown and described with reference to a preferred embodiment thereof, it will be understood by those skilled in the art that various changes in form and details may be made therein without departing from the spirit and scope of the invention.

We claim:
1. Apparatus for switching electric currents, including:
   first and second terminals,
   a rotatable commutator having a plurality of conductive segments insulated from one another,
   brush means positioned to contact said segments sequentially when said commutator is rotated,
   at least one controlled rectifier,
   a first circuit, which excludes said rectifier, for connecting said first and second terminals by way of said brush means and the first of said segments when said brush means contacts said first segment.
   a second circuit for connecting said first and second terminals by way of said rectifier, the brush means and a second of said segments when said brush means is in contact with said second segment only, substantial currents being able to pass between said first and second terminals only by way of said second circuit when said brush means is in contact with said second segment only,
   firing means for causing said rectifier to conduct before said brush means breaks contact with said first segment, and
   extinguishing means for causing said rectifier to seek conduction before said brush means breaks contact with said second segment.

2. Apparatus for providing alternating electrical current from a direct current supply, including:
a commutator having first, second, third and fourth conductive segments insulated from one another,
brush means adapted to contact said first, second, third and fourth segments in that order when said commutator rotates in one direction,
first and second supply terminals adapted to be connected to a direct current supply having a tap connection,
a load terminal adapted to be connected to one terminal of a load the other terminal of which is, in operation, connected to said tap of said direct current supply,
first and second circuits for connecting said first and second supply terminals, respectively, to said load terminal when said brush means contact said first and third segments respectively,
a first controlled rectifier connected between said first supply terminal and said load terminal when said brush means contact said second segment,
a second controlled rectifier connected between said second supply terminal and said load terminal when said brush means contact said fourth segment.
first and second firing means for causing said first and second rectifiers to conduct before said brush means break contact with said first and third segments, respectively, and
extinguishing means for causing said first and second rectifiers to cease conduction before said brush means breaks contact with second and fourth segments, respectively.

3. Apparatus according to claim 2 wherein said first and second firing means include first and second transformers, respectively, having primary and secondary windings,
said secondary windings of said first and second transformers being coupled across a control electrode and other electrodes of said first and second rectifiers, respectively,
said primary windings of said first and second transformers being coupled to said first and third segments, respectively, and
said first and second segments being divided into main and subsidiary segments insulated from one another but connected by way of said primary windings of said first and second transformers, respectively.

4. Apparatus according to claim 2, wherein said extinguishing means includes:
an inductor having a tap connection, said inductor being connected to pass currents, carried by said first rectifier from one end of said inductor to said tap, and to pass current carried by said second rectifier from the other end of said inductor to said tap, said other end of said inductor being connected to said second supply terminal when said first rectifier is to be extinguished, and said one end of said inductor being connected to said first supply terminal when said second rectifier is to be extinguished, and
said extinguishing means also includes a capacitor, one terminal of which is coupled to said tap of said inductor, and the other terminal of which is adapted to be coupled to said tap of said supply to back bias either of said rectifiers when one of said ends of said inductor becomes connected to one of said supply terminals.

5. Apparatus according to claim 4 wherein:
said commutator has first and second rings of segments,
said brush means includes a pair of brushes, one brush for each said ring,
said inductor is connected between said brushes,
said first ring includes said first and second segments and a first isolating segment, and
said second segment includes said third and fourth segments and a second isolating segment, and
the brushes and the segments being positioned in relation to one another to cause said first brush to be in contact with said first isolating segment, except that said first brush is positioned to contact said first segment, back biasing said second rectifier, immediately before said second brush leaves said fourth segment, and to cause said second brush to contact said second isolating segment when said first brush is in contact with said first and second segments, except that said second brush is positioned to contact said third segment, back biasing said first rectifier, immediately before said first brush leaves said second segment.

6. Apparatus according to claim 5 for supplying a multiphase load, including:
a pair of further brushes, a further load terminal, a further inductor with a tap connection, and a further capacitor for each phase additional to single phase,
each said inductor being connected between said brushes of one of said pairs, with its said tap connection connected to one of said capacitors and one of said load terminals,
said brush pairs being equally spaced around said commutator and,
said first and second isolating segments being divided into main and subsidiary segments inuslated from one another,
said first brush being positioned to contact the first subsidiary isolating segment before said second brush leaves said third main segment, and said second brush being positioned to contact said second subsidiary isolating segment before said first brush leaves said first main segment.

7. Apparatus according to claim 3, wherein said extinguishing means includes:
an inductor having a tap connection, said inductor being connected to pass currents, carried by said first rectifier from one end of said inductor to said tap, and to pass current carried by said second rectifier from the other end of said inductor to said tap, said other end of said inductor being connected to said second supply terminal when said first rectifier is to be extinguished, and said one end of said inductor being connected to said first supply terminal when said second rectifier is to be extinguished,
said extinguishing means also includes a capacitor, one terminal of which is coupled to said tap of said inductor, and the other terminal of which is adapted to be coupled to said tap of said supply to back bias either of said rectifiers when one of said ends of said inductor becomes connected to one of said supply terminals,
said commutator has first and second rings of segments,
said brush means includes a pair of brushes, one brush for each said ring,
said first ring includes said first and second segments and a first isolating segment, and
said second segment includes said third and fourth segments and a second isolating segment, and
the brushes and the segments being positioned in relation to one another to cause said first brush to be in contact with said first isolating segment when said second brush is in contact with said third and fourth segments, except that said first brush is positioned to contact said first segment, back biasing said second rectifier, immediately before said second brush leaves said fourth segment, and to cause said second brush to contact said second isolating segment when said first brush is in contact with said first and second segments, except that said second brush is positioned to contact said third segment, back biasing said first rectifier, immediately before said first brush leaves said second segment.

8. Apparatus according to claim 7, wherein:
said inductor is coupled between said controlled rectifiers and said tap connection of said inductor is coupled to said second and fourth segments, and
said brushes and said load terminals are connected together.

9. Apparatus according to claim 8 wherein:
said first and second firing means include third and fourth transformers having primary and secondary windings, said secondary windings of said third and fourth transformers being connected in parallel with said secondary windings of said first and second transformers, respectively,
said first and third segments each include further subsidary segments insulated from the other said segments, and
said primary windings of said third and fourth transformers are connected between said main segment and said further subsidiary segment of said first and third segments, respectively.

10. Apparatus according to claim 9 for supplying a multi-phase load, including
a pair of further brushes and a further load terminal for each phase additional to single phase,
each said load terminal and said brushes of each pair being coupled together,
said brush pairs being equally spaced around said commutator, and
said first and second isolating segments being divided into main and subsidiary segments positioned to cause the first brush of each said pair to contact said subsidiary segment of said first isolating segment before the second brush of that said pair leaves said main segment of said third segment, and the second brush of each said pair contacts the subsidiary segment of said second isolating segment before the first brush of that pair leaves the said main segment of said first segment.

11. Apparatus according to claim 4, wherein said first, second, third and fourth segments are in a single ring.

12. Apparatus according to claim 11, wherein:
said inductor is coupled between said controlled rectifiers,
said tap connection of said inductor is coupled to said second and fourth segments, and
said brushes and said load terminals are connected together.

13. Apparatus according to claim 12 for supplying a multiple-phase load, including a brush coupled to a load terminal for each phase of said load, said brushes being evenly spaced around said commutator.

14. Apparatus according to claim 13 wherein:
said second and fourth segments subtend an angle of $\theta_1$ at the centre of rotation of said commutator, the said subsidiary segments of said first and fourth segments subtend an angle of $\theta_2$ at said centre, each said brush obtains an angle of $\theta_b$ at said centre the centres of said brushes are separated by equal angles $\phi$, $\theta_2 \geqslant \theta_b$,
$\theta_2 \leqslant \phi/2 - \theta_b$,
$\theta_1 + \theta_2 \leqslant \phi - \theta_b$, and
$\theta_1 + \theta_2 > \phi/2 + \theta_b$ 15. Apparatus according to claim 2 for providing an output signal of frequency $q60/n$ cycles per second where $n$ is the frequency of rotation of said commutator in revolutions per minute, and $q$ is an integral number, including a commutator having $q$ said first, second, third and fourth segments.

16. Apparatus according to claim 2 including first and second slip-rings and brush assemblies to connect said first and second supply terminals to said first and third segments respectively.

17. Apparatus according to claim 3 including third, fourth, fifth and sixth slip-ring and brush assemblies for connecting said primary windings of said transformers to said main and subsidiary sections of said first and third segments, respectively.

18. Apparatus according to claim 4 including first and second oppositely poled diodes coupled between said tap connection of said inductor and said first and second supply terminals, respectively, at least every time one of said rectifiers conducts.

19. Apparatus according to claim 3 including an induction motor coupled to said load terminals.

20. Apparatus according to claim 3 wherein loading means are connected across said secondary winding of each said transformer to cause the primary winding of each said transformer to present a low impedance.

21. Apparatus according to claim 20 wherein each firing means includes a further rectifier and an amplifier coupled between said secondary winding of each transformer and that one of said controlled rectifiers to which said secondary winding is coupled.

22. Apparatus according to claim 19 wherein a ballast resistance load is connected in parallel with said motor at least when said motor is on no load.

References Cited

UNITED STATES PATENTS

| | | | |
|---|---|---|---|
| 2,610,231 | 9/1952 | Wettstein | 321—48 X |
| 2,884,584 | 4/1959 | Brueckner | 321—48.4 |
| 3,118,106 | 1/1964 | Robinson | 321—49 |
| 3,437,898 | 4/1969 | Bates | 318—138 |
| 3,453,513 | 7/1969 | Bates | 318—138 |

FOREIGN PATENTS

| | | |
|---|---|---|
| 872,598 | 6/1953 | Germany. |

J D MILLER, Primary Examiner

W. H. BEHA, Jr., Assistant Examiner

U.S. Cl. X.R.

310—222; 321—49